United States Patent [19]

Shima et al.

[11] Patent Number: 5,319,738
[45] Date of Patent: Jun. 7, 1994

[54] NEURAL NETWORK DEVICE

[75] Inventors: Takeshi Shima, Sagamihara; Yukio Kamatani, Yokohama, both of Japan

[73] Assignee: Kabushiki Kaisha Toshiba, Kawasaki, Japan

[21] Appl. No.: 734,780

[22] Filed: Jul. 23, 1991

[30] Foreign Application Priority Data

Jul. 25, 1990 [JP] Japan .................. 2-194822
Feb. 25, 1991 [JP] Japan .................. 3-53305

[51] Int. Cl.$^5$ .................. G05B 13/00; H03K 19/20
[52] U.S. Cl. .................. 395/24; 395/23; 395/27
[58] Field of Search .................. 395/24, 23, 27, 22

[56] References Cited

U.S. PATENT DOCUMENTS

| | | | |
|---|---|---|---|
| 4,858,147 | 8/1989 | Conwell | 395/27 |
| 4,874,963 | 10/1989 | Alspector | 395/23 |
| 4,912,655 | 3/1990 | Wood | 364/513 |
| 4,941,122 | 7/1990 | Weideman | 364/807 |
| 5,025,282 | 6/1991 | Nakamura et al. | 355/38 |
| 5,034,918 | 7/1991 | Jeong | 395/24 |
| 5,040,214 | 8/1991 | Grossberg et al. | 395/22 |
| 5,059,814 | 10/1991 | Mead et al. | 395/24 |
| 5,075,869 | 12/1991 | Holler et al. | 395/24 |
| 5,086,479 | 2/1992 | Takenaga et al. | 382/14 |
| 5,146,542 | 9/1992 | Engeler | 395/24 |

OTHER PUBLICATIONS

Mano, "Computer System Architecture", Second Edition, Prentice-Hall, 1982, pp. 54–59.
"Parallel Distributed Processing", vol. 1: Foundations; The MIT Press, 1988, pp. 322–330; David E. Rumelhart et al.
IEEE Spectrum, Jan. 1991, pp. 52–55.
SPIE vol. 634, Optical and Hybrid Computing (1986); Teuvo Kohonen.
"The Perceptron: A Probabilistic Model for Information Storage and Organization in the brain"; F. Rosenblatt, 1958.
"Analysis and Design of Analog Integrated Circuits"; Paul R. Gray et al., 1984, John Wiley & Sons.
"Neural and Concurrent Real-Time Systems"; Branko Soucek, 1989, John Wiley & Sons.

*Primary Examiner*—Michael R. Fleming
*Assistant Examiner*—Robert W. Downs
*Attorney, Agent, or Firm*—Oblon, Spivak, McClelland, Maier & Neustadt

[57] ABSTRACT

This invention has an object to provide a practical neural network device. The first neural network device of this invention comprises an input circuit for performing predetermined processing of external input information and generating an input signal, an arithmetic processing circuit for performing an arithmetic operation of the input signal in accordance with a plurality of control parameters and generating an output signal, and a control circuit for controlling the control parameters of the arithmetic processing circuit so that the output signal is set to satisfy a predetermined relationship with the input signal, the control circuit including a first cumulative adder for performing cumulative summation of updating amounts of the control parameters for a plurality of proposition patterns supplied as the input signal during learning, and a second cumulative adder for adding currently used control parameter values to values obtained by the first cumulative adder to obtain new control parameter values.

5 Claims, 12 Drawing Sheets

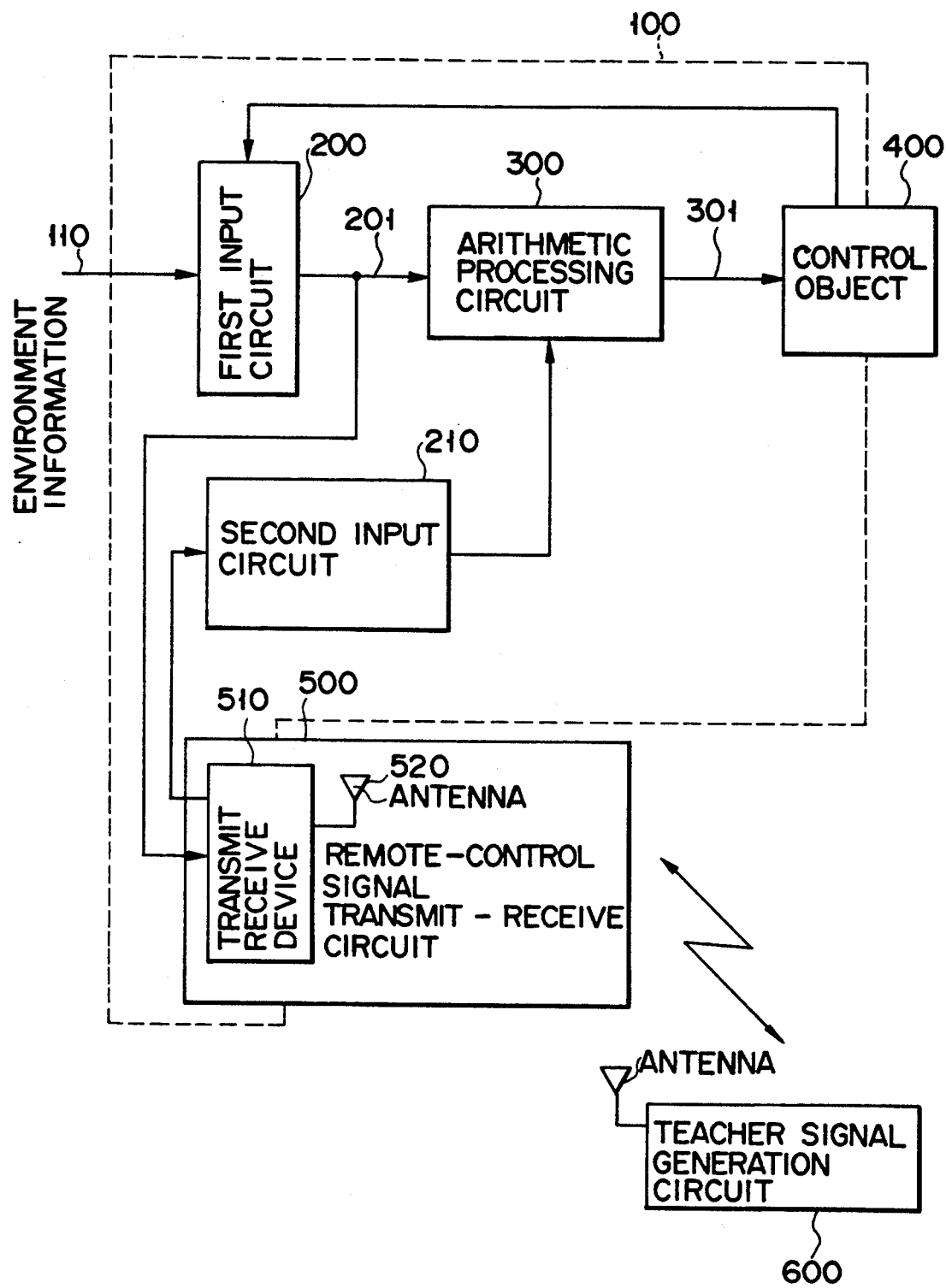
F I G. 2

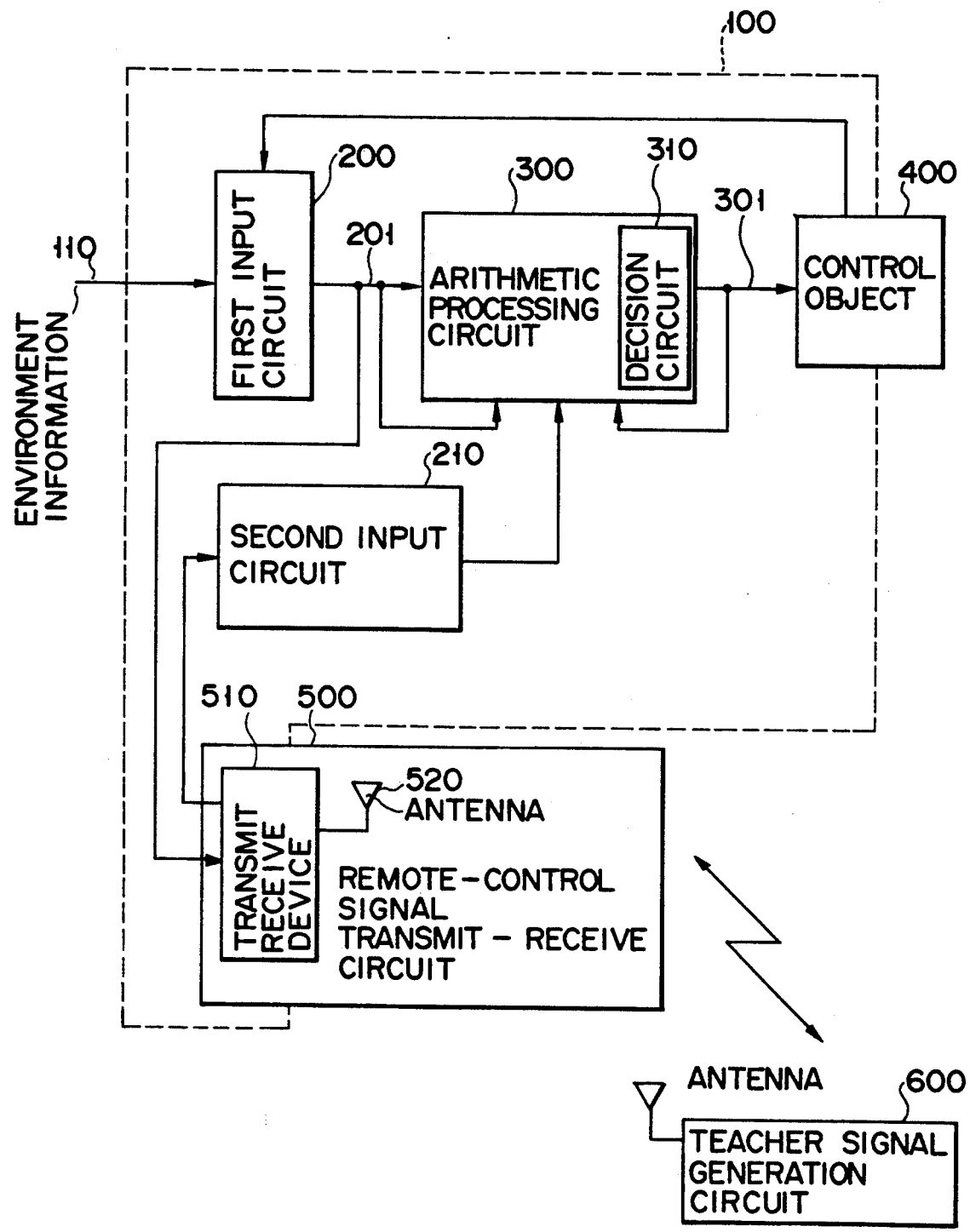
F I G. 3

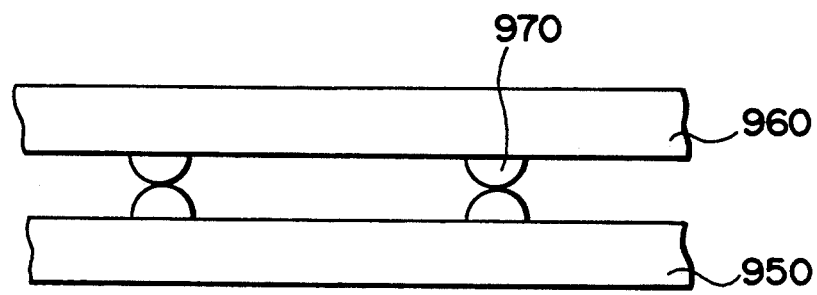
F I G. 4A
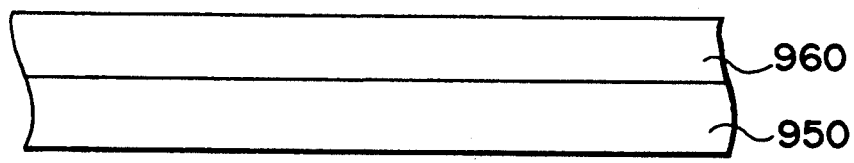
F I G. 4B

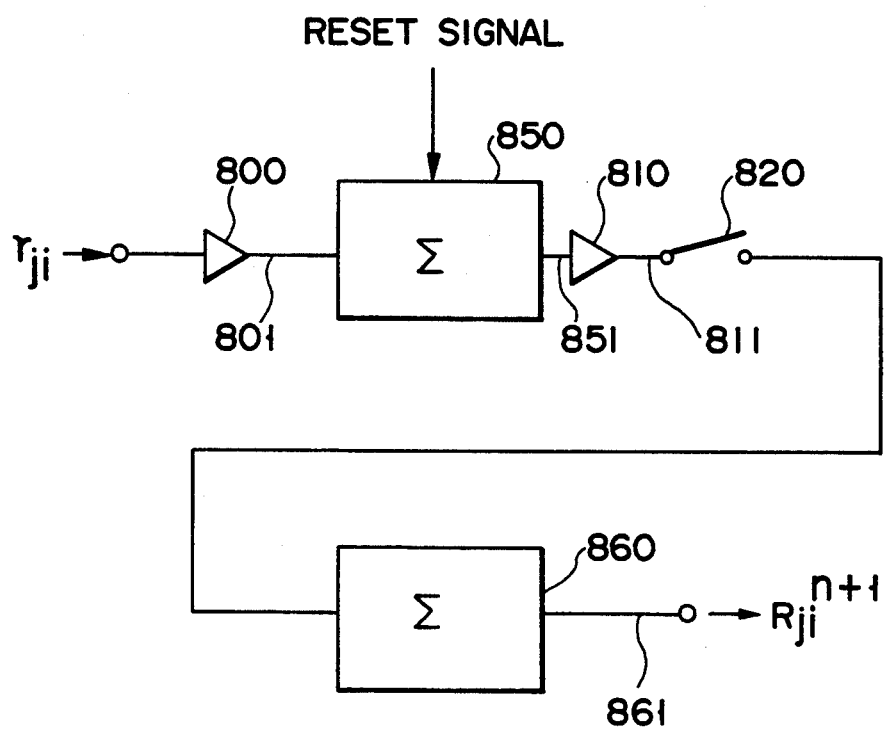
F I G. 5

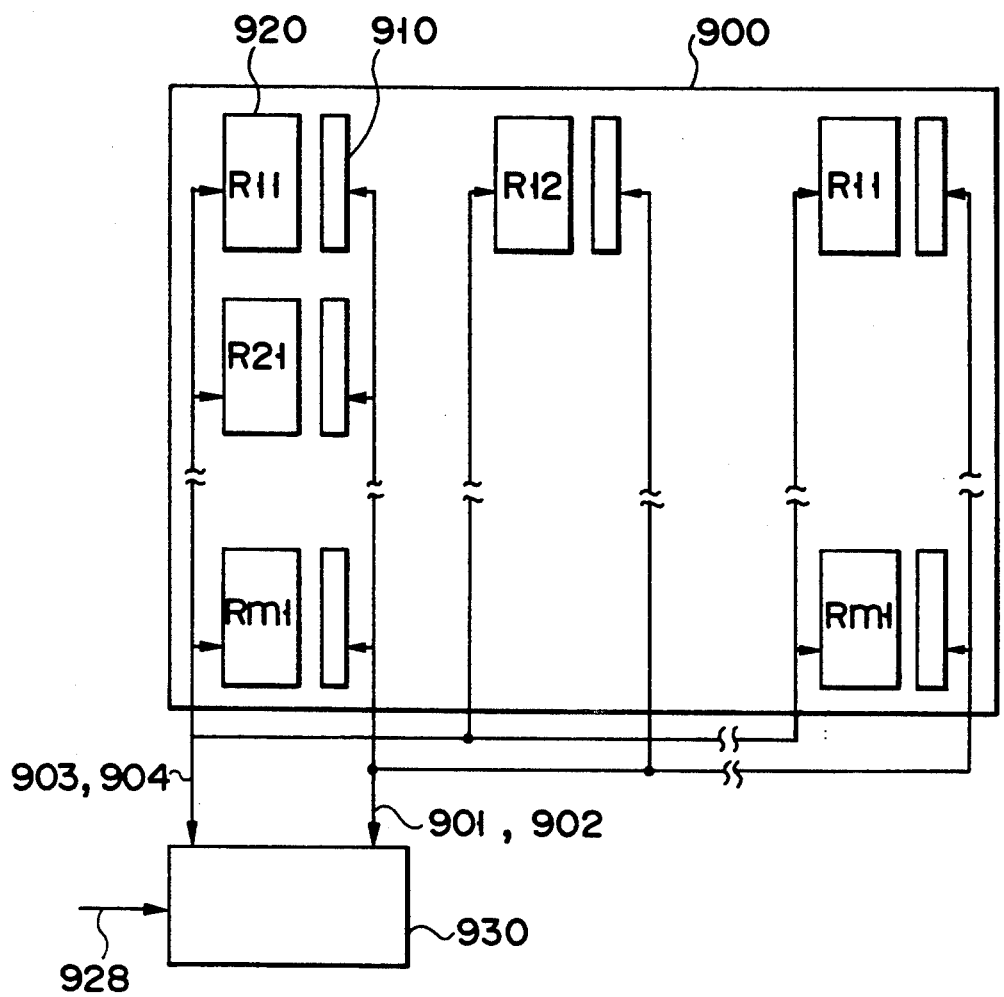
F I G. 8

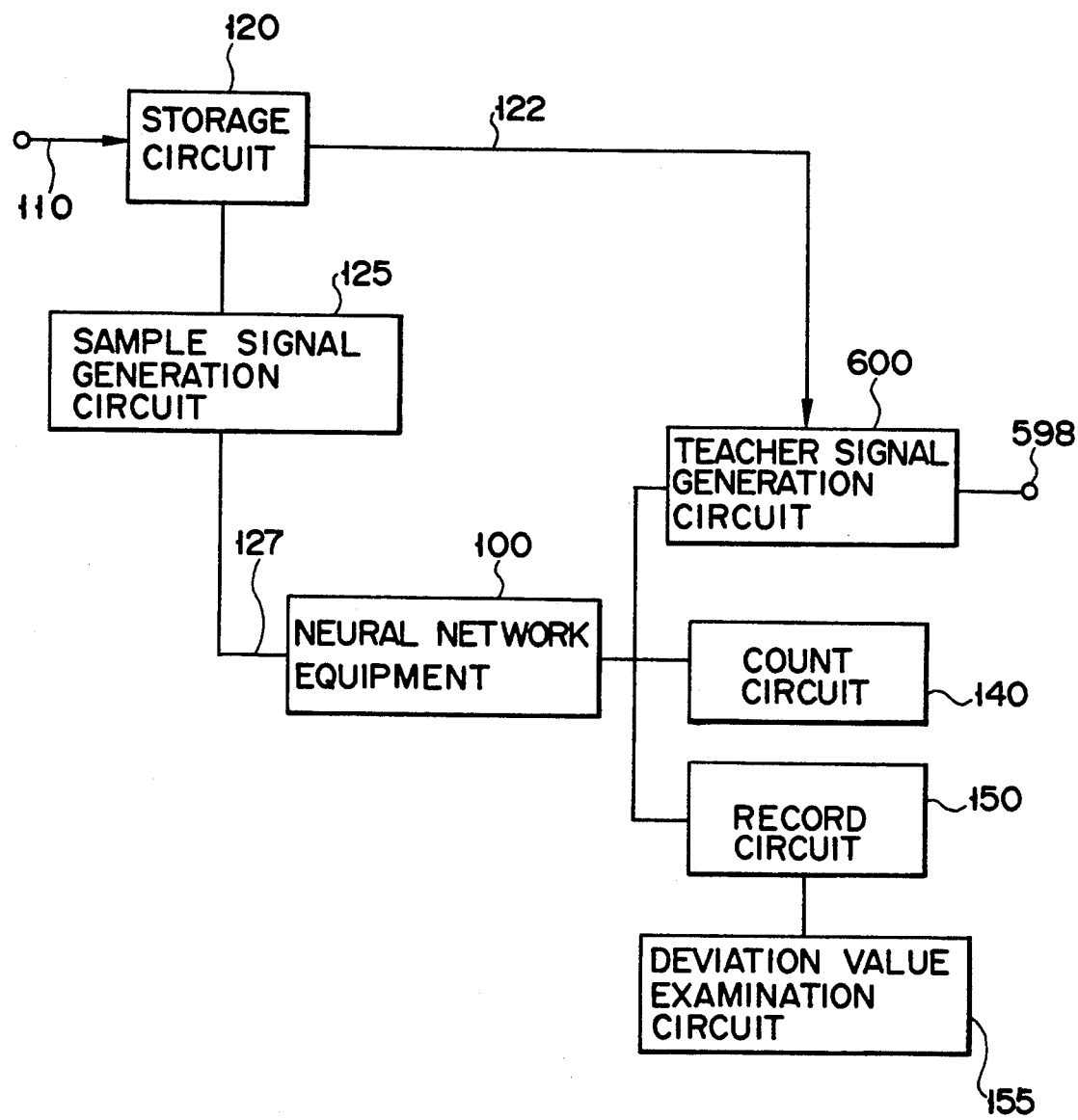
F I G. 9

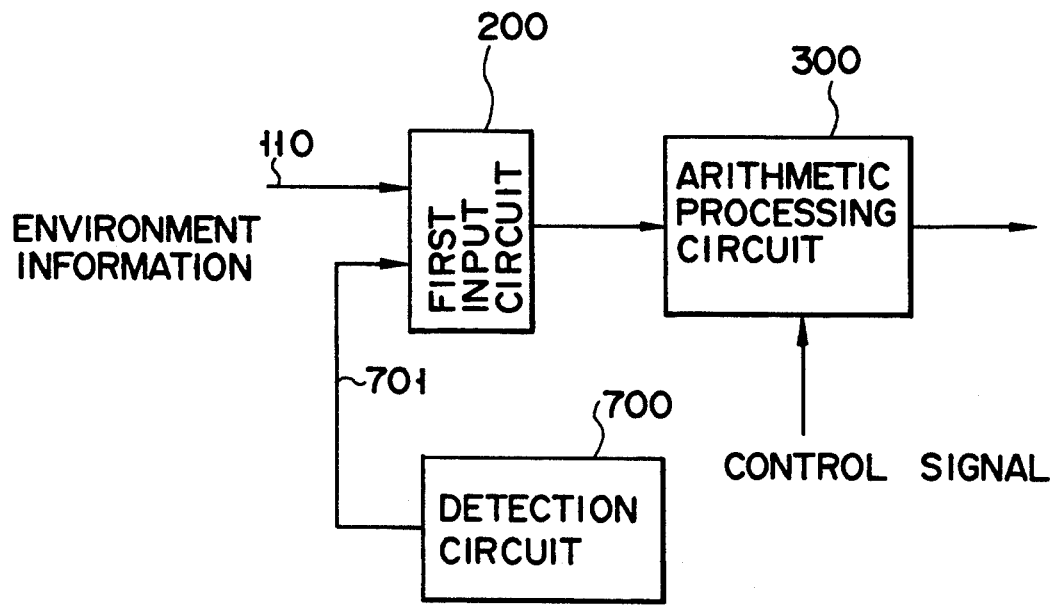
F I G. 12
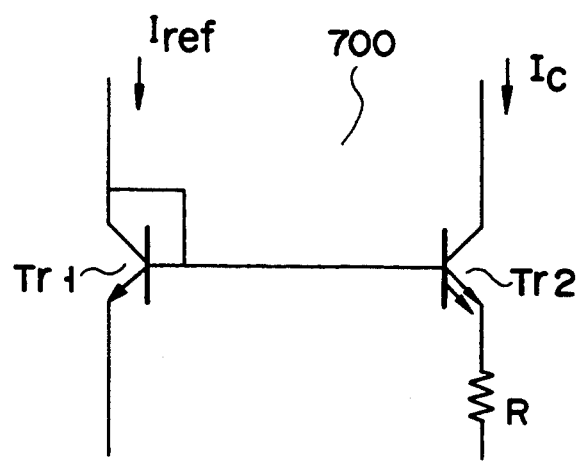
F I G. 13

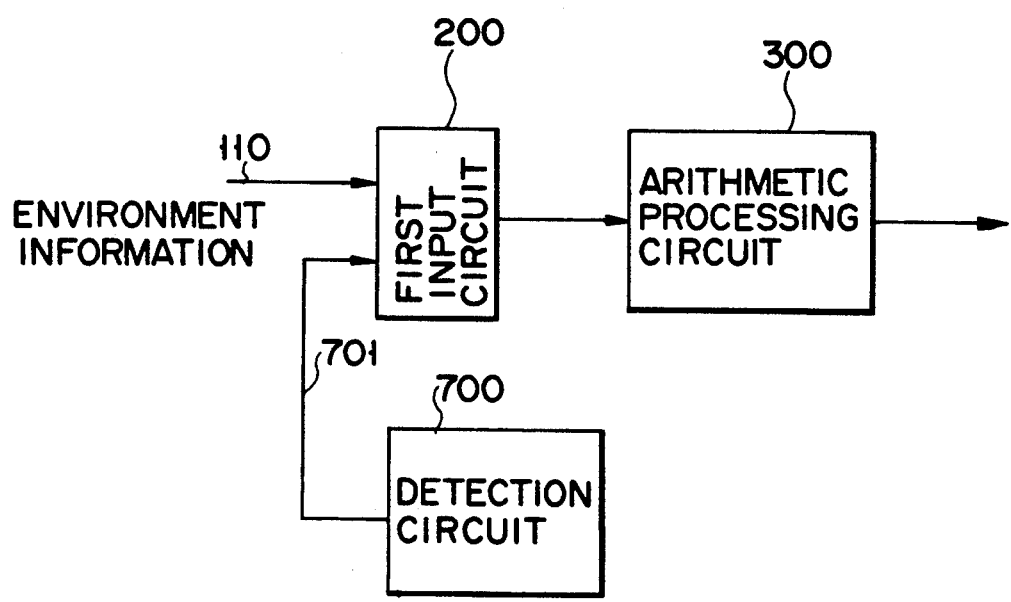
F I G. 14

NEURAL NETWORK DEVICE

BACKGROUND OF THE INVENTION

1. Field of the Invention

The present invention relates to a neural network device widely used in like as recognition (e.g., character recognition or speech recognition), motion control (e.g., robot control), general process control, or neurocomputers.

2. Description of the Related Art

One general paper concerning a neural network is Teuvo Kohonen, "*Representation of sensory information in self-organizing feature maps, and relation of these maps to distributed memory networks*", SPIE Vol. 634, Optical and Hybrid Computing., pp. 248–259 (1986).

According to the above reference, one of the systems called neural networks is defined by the following three ordinary differential equations:

$$dy/dt = f(x,y,M,N) \quad (1)$$

$$dM/dt = g(x,y,M) \quad (2)$$

$$dN/dt = h(y,N) \quad (3)$$

where x is a vector representing an input, y is a vector representing an output, M and N are parameter matrices, and f, g, and h are nonlinear functions.

An electronic circuit used in signal processing will be taken into consideration. The system parameter matrices M and N are represented by resistances, capacitances, and the like, and are, in most cases, constants. More specifically, since the respective elements of the matrices M and N in equations (2) and (3) are constants, the right-hand sides of equations (2) and (3) become zero.

In a system called a neural network, the system parameter matrices M and N are values which change as a function of time When the system parameter matrices M and N instantaneously change in accordance with equations (2) and (3), a normal storage function and a learning function based on the normal storage are realized. In addition, although storage and learning take a long period of time, an output can be obtained in response to an input within a very short period of time. In the above three equations, the matrices M and N change slowly as compared with the vectors x and y.

Another conventional neural network is defined by the following two ordinary differential equations (Reference: F. Fosenblatt, "*The perceptron: a probabilistic model for information storage and organization in the brain*", Psychological Review 65, pp. 386–408 (1958)):

$$dy/dt = f(x,y,M) \quad (4)$$

$$dM/dt = g(x,T,M) \quad (5)$$

where x is a vector representing an input, y is a vector representing an output, T is a vector representing a teacher signal, M is a system parameter matrix, f and g are nonlinear functions. In the system described by equations (4) and (5), in order to obtain a desired output in response to an input, a teacher signal is additionally used.

As described above, various modifications may be considered, but a neural network system is characterized that it has a storage function and a learning function based on storage.

One of the systems described by equations (4) and (5) will be described below in detail.

The system described by equations (4) and (5) is so-called perceptron which is a neural network system (see the above reference) having a layer structure, proposed by Rosenblatt et. al. in 1958. The perceptron having a large number of layers is called a multilayered perceptron. The structure of the multilayered perceptron is known to resemble synapses of neurons in a cerebellum or cerebral cortex. A mathematical analysis concerning an information processing capacity of a multilayered perceptron has been developed. For example, a perceptron having $n(2n+1)$ neurons can express a continuous function having n arbitrary variables according to the theorem of Kolmogorov (Reference: Branko Soucek, "*Neural and Concurrent Real-Time Systems*", JOHN WILEY & SONS (The Sixth Generation), pp. 77–79).

A parameter of a multilayered perceptron is a value of connection weight between synapses of neurons. By updating said parameter in accordance with a differential equation called a learning equation, nonlinear adaptive network can be arranged.

In recent years, an error backward propagation learning algorithm is developed by Rumelhart et. al., and the above parameter can be obtained in accordance with a steepest descent method (Reference D. E. Rumelhart et al., "*PARALLEL DISTRIBUTED PROCESSING; Exploration in the Microstructure of Cognition (Vol. 1: Foundations)*", The MIT Press (1988), pp. 322–330).

The above multilayered perceptron will be described with reference to FIG. 1.

FIG. 1 shows a three-layered perceptron. The first layer is called an input layer consisting of $S_i$ ($i=1, 2, \ldots, h$) neurons. The second layer is called an intermediate layer consisting of $A_i$ ($i=1, 2, \ldots, p$) neurons. The third layer is called an output layer consisting of $R_i$ ($i=1, 2, \ldots, m$) neurons. A connection weight connected by m synapses is represented by $RS_{ji}$ and $RA_{ji}$ ($i=1, \ldots, h; j=i, \ldots, l$). Assume that a signal propagates from the left to the right in FIG. 1. In addition, in all neurons, a relationship between the input and output signals in each neuron is assumed as projection according to a monotonous nonlinear function. It is also assumed that an input to the input layer of the neuron is externally supplied. Inputs to neurons except for those in the intermediate and output layers are subjected to the following weight sum operations:

$$(\text{Input to Neuron } A_i) = \sum_{j=i}^{p} (PS_{ji} \cdot (\text{Output of } S_j)) \quad (6)$$

$$(\text{Input to Neuron } R_i) = \sum_{j=1}^{m} (RA_{ji} \cdot (\text{Output of } A_j)) \quad (7)$$

The above error backward propagation learning algorithm will be described below. The error backward propagation learning algorithm is a learning algorithm used when a teacher signal is supplied to only the last layer. When a projection result from an input signal $x_1$ (a total sum of signals input from other neurons) of a neuron of interest of an arbitrary layer to an output signal from the neuron of the interest is represented by O, a connection weight $R_{ji}^{n+1}$ in a learning count $n+1$ is generally defined as follows:

$$R_{ij}^{n+1} = R_{ij}^{n} + \rho \cdot \epsilon_j O_j \quad (8)$$

where $\rho$ is the relaxation coefficient. When the neuron is located in the output layer, $\epsilon_j$ is defined as follows:

$$\epsilon_j = (t_j - O_j) \cdot F_j' \qquad (9)$$

where $t_j$ is the jth element of the teacher signal T.

When the neuron is not located in the output layer, $\epsilon_j$ is given as follows:

$$\epsilon_j = F_j' \cdot \sum_k (\epsilon_k \cdot R_{kj}) \qquad (10)$$

where F' is the first-order differential form of F by x. This algorithm is applied to the processing network.

The neural network is exemplified by the multi-layered perceptron in the above description. Conventional problems will be described below.

When a neural network device incorporating hardware which realizes equations (1) to (10) is assumed to be learnt in a given environment inaccessible to man, e.g., in a living body, there is no way to input the signal $t_j$ in equation (9) in the neural network device, and its application fields are therefore limited.

Equations (1) to (10) include arithmetic operations such as flexible long-term storable synapse function operations in addition to the four basic arithmetic operations. In addition, these equations include a nonlinear function in which the relationship between the input and output has a monotonously increased saturation characteristic curve, and a differential function of the nonlinear function. For these reasons, an extensive study is required to realize the arithmetic operations of equations (1) to (10) by a device or an electronic circuit.

The four basic arithmetic operations, the nonlinear function in which the relationship between the input and output has a monotonously increased saturation characteristic curve, and the differential function of the nonlinear function can be realized by conventional analog/digital electronic circuit techniques. The long-term programmable synapse function arithmetic operations can be realized by a conventional EEPROM and thin-film devices. It is, however, difficult to manufacture such a thin-film device because the thin-film device is incompatible with an LSI fabrication process.

In a conventional device, an $\epsilon_j$ value and a connection weight $R_{ji}{}^{n+1}$ are obtained by an analog circuit. An accurate $\epsilon_j$ value and an accurate connection weight $R_{hi}{}^{n+1}$ cannot be obtained by noise superposed on circuit signals, an offset, and a gain error, thus degrading the learning function.

As described above, the conventional neural network device has a narrow range of application fields, and a learning function cannot be effected as desired.

Conventional device techniques are reported in IEEE SPECTRUM Jan. (1991), pp. 52-55.

SUMMARY OF THE INVENTION

It is an object of the present invention to provide a practical neural network device.

According to the first aspect of the present invention, there is provided a neural network device comprising:

input means for performing predetermined processing of external input information and generating an input signal;

arithmetic processing means for performing an arithmetic operation of the input signal in accordance with a plurality of control parameters and generating an output signal; and control means for controlling the control parameters of the arithmetic processing means so that the output signal is set to satisfy a predetermined relationship with the input signal, the control means including first cumulative summation means for performing cumulative summation of updating amounts of the control parameters for a plurality of proposition patterns supplied as the input signal during learning, and second cumulative summation means for adding currently used control parameter values to values obtained by the first cumulative summation means to obtain new control parameter values.

The control means, part of which is arranged outside the arithmetic processing means, of the neural network device includes means for causing the part of the control means arranged outside the arithmetic processing means to receive the input signal through transmit-receive means, and means for controlling the control parameters of the arithmetic processing means through the transmit-receive means.

According to the second aspect of the present invention, there is provided a neural network device, comprising:

input means for performing predetermined processing of external input information and generating an input signal;

arithmetic processing means for performing an arithmetic operation of the input signal in accordance with a plurality of control parameters and generating an output signal; and control means for controlling the control parameters of the arithmetic processing means so that the output signal is set to satisfy a predetermined relationship with the input signal, the control means including a plurality of synapse groups each including first memory means and second memory means, the first memory means storing updating amounts of the input control parameters, the second memory means storing the control parameter values, and cumulative summation means, connected to the plurality of the synapse groups, for performing cumulative summation of the updating amounts of the control parameter values.

According to the third aspect of the present invention, there is provided a neural network device, comprising:

input means for performing predetermined processing of external input information and generating an input signal;

arithmetic processing means for performing an arithmetic operation of the input signal in accordance with a plurality of control parameters and generating an output signal;

control means for controlling the control parameters of the arithmetic processing means so that the output signal is set to satisfy a predetermined relationship with the input signal; and detecting means for detecting temperatures of an interior, a boundary, and an exterior of an area in which the input means, the arithmetic processing means, and the control means are incorporated, and for outputting the detected temperatures to the input means.

According to the first aspect of the present invention, the control means for controlling the control parameters calculates new updating amounts on the basis of the signs of the updating amounts of the control parameters. Even if the updating amounts become larger or smaller than the actual values, the signs of the values tend not to change by the above means. Therefore even if the updating amount values become inaccurate due to noise and nonideal components of respective circuits constituting the neural network device, accurate control parameters can be obtained.

In addition, according to the first aspect of the present invention, when a relative positional relationship between the neural network device and the environment such as a geometric relationship between the device and the environment, a degree of adaptability of the device to the environment, or a response of the device to an external stimulus is acquired by learning, the external stimulus and the teacher signal can be generated outside the neural network device. Therefore, there is provided a neural network device useful in a location normally inaccessible to man as in an artificial heart pacemaker in a living body, blood flow control in a blood vessel, an extreme robot, and a seabed robot.

According to the second aspect of the present invention, a plurality of comparators, the number of which does not degrade the operation, can be connected in parallel with each other, and a common up/down counter is used to reduce the size of the device.

According to the third aspect of the present invention, the detecting means is arranged to detect temperatures of the interior and exterior of the area in which the respective elements are stored. Since output signals from the detecting means are used as some of the input signals to perform learning in consideration of environmental temperatures, a high-performance neural network device is obtained.

As described in detail above, since the learning capability can be improved and the device can be used in a location normally inaccessible to man according to the present invention, there is provided a practical neural network device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing a schematic arrangement of a neural network device according to the first embodiment of the present invention;

FIG. 3 is a block diagram showing a schematic arrangement of a neural network according to the second embodiment of the present invention;

FIGS. 4A and 4B are views for explaining arithmetic processing ICs of the neural network devices shown in FIGS. 2 and 3, respectively;

FIG. 5 is a block diagram showing the first arrangement for obtaining control parameter values;

FIG. 8 is a block diagram showing the third arrangement for obtaining control parameter values;

FIG. 9 is a block diagram showing a schematic arrangement of a performance evaluation unit for the neural network device;

FIG. 12 is a block diagram showing the main part of a neural network device according to the third embodiment of the present invention;

FIG. 13 is a circuit diagram showing a detailed arrangement of a detection circuit in FIG. 12; and FIG. 14 is a block diagram of the main part of a neural network device according to the fourth embodiment of the present invention.

DETAILED DESCRIPTION OF THE PREFERRED EMBODIMENTS

Figure 1:
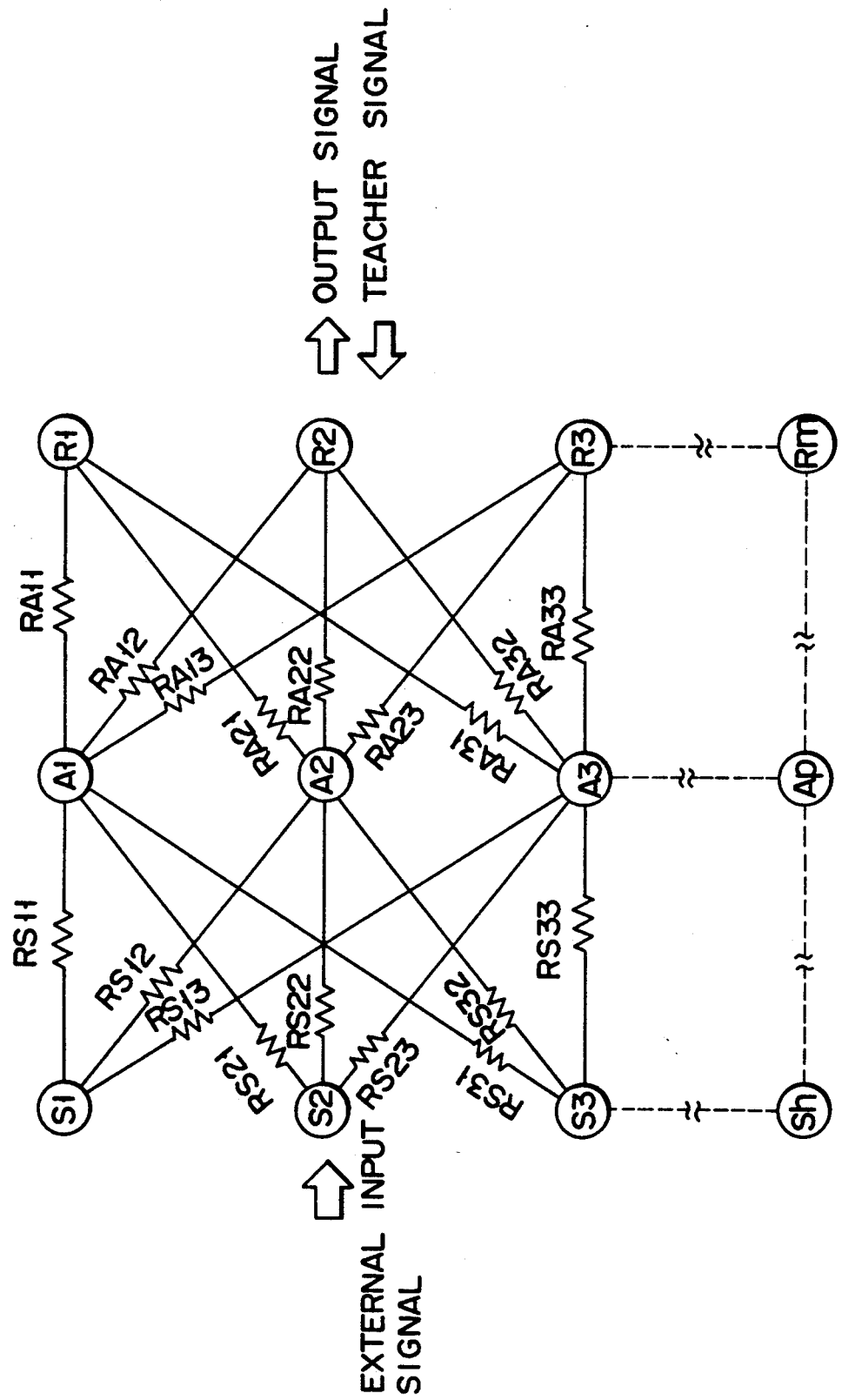
FIG. 1 is a diagram for explaining a conventional multilayered perception.

Preferred embodiments of the present invention will be described with reference to the accompanying drawings.

FIG. 2 is a block diagram showing a schematic arrangement of a neural network device according to the first embodiment of the present invention.

Environment information 110 (e.g., light, sound, pressure, temperature, smell, taste, and hardness) is input to a first input circuit 200. The first input circuit 200 performs filtering of an image signal when the environment information 110 is a visual information signal. The first input circuit 200 performs filtering of a speech signal when the environment information 110 is an audio information signal. The first input circuit 200 outputs the filtering result as a signal 201. The signal 201 is output to an arithmetic processing circuit 300 and a remote-control signal transmit-receive circuit 500.

The arithmetic processing circuit 300 performs arithmetic processing of the input signal 201 by a plurality of control parameters corresponding to equations (1) to (10) and outputs a signal 301. The signal 301 is input to a control object 400 for controlling a relationship between the environment and the neural network device. The control object 400 is operated in accordance with the signal 301. For example, in an automobile, the control object 400 is operated to keep an automobile height constant or perform a braking operation to prevent a collision or crash. In a robot, the control object 400 is operated as a mechanism for performing various operations. The control object 400 has a function of cooperating with the first input circuit 200 to cause it to perform view control or the like. When the neural network device is used as a recognition apparatus, the control object 400 has a function as, e.g., a CRT, a loudspeaker, or a display unit (e.g., an LED) for displaying a factor (e.g., small or sound) which can not be directly displayed.

The signal 201 input to the remote-control signal transmit-receive circuit 500 is transmitted to a teacher signal generation circuit 600 arranged outside a device body 100 through a transmit-receive device 510 and an antenna 520. A teacher signal corresponding to the signal 201 received by the teacher signal generation circuit 600 is transmitted to and is received by the remote-control signal transmit-receive circuit 500. The received signal is input to the arithmetic processing circuit 300 through a second input circuit 210. Control parameter adjustment (to be described later) is performed by the teacher signal in the arithmetic processing circuit 300.

In the first embodiment, when the relationship between the neural network device itself and the environment such as a geometric relationship between the device and the environment, a degree of adaptation of the device to the environment, and a response of the device to an environmental stimulus is acquired by learning, the environmental stimulus and the teacher signal can be monitored or designated at a location different from the neural network device 100 by the remote-control signal transmit-receive circuit 500. For this reason, there is provided a neural network device useful for a position normally inaccessible to man as in an artificial heart pacemaker in a living body, blood flow control of a blood vessel in a living body, an extreme robot, or a seabed robot according to the present invention.

FIG. 3 is a block diagram showing a schematic arrangement of a neural network device according to the second embodiment of the present invention. The reference numerals as in FIG. 2 denote the same parts in FIG. 3, and a detailed description thereof will be omitted.

The neural network device of the second embodiment is different from that of the first embodiment in the following two points. First, in addition to the teacher signal generated by a teacher signal generation circuit 600, signals 201 and 301 are also used as teacher signals. That is, three teacher signals are used. Second, a decision circuit 310 for deciding a relationship between the environment and a device body 100 is arranged in an arithmetic processing circuit 300.

The neural network device according to the second embodiment can generate a teacher signal for performing a desired operation during learning while environment information 110 is being monitored. Therefore, the neural network device can be used in a variety of applications in the fields of recognition, decision, and control.

FIG. 4A is a view showing an integrated circuit (IC) constituting the arithmetic processing circuit 300. In order to realize the arithmetic processing circuit 300 by an IC, a first integrated circuit 950 manufactured by a conventional LSI fabrication process and a second integrated circuit 960 manufactured by a thin-film device fabrication process can be stacked on each other through solder bumps 970, as shown in FIG. 4A. When the second integrated circuit 960 comprises a magnetic member, a spiral electrode is formed on the first integrated circuit 950. The first and second integrated circuits 950 and 960 are brought into contact with each other through the spiral electrode without aligning the two types of integrated circuits, as shown in FIG. 4B. The direction of magnetization can be controlled by a direction of a current flowed through the spiral electrode. Therefore, the second integrated circuit 960 has a memory function.

Three arrangements for causing the arithmetic processing circuit 300 to obtain the control parameters will be described below.

FIG. 5 is a schematic block diagram showing the first arrangement for obtaining $R_{ji}^{n+1}$, i.e., control parameters in equation (8).

During the learning process, when a plurality of learning data patterns $Z_1, Z_2, \ldots, Z_p$ are sequentially input, in general, output signals corresponding to the inputs are compared with a teacher signal to obtain errors, and a connection weight is corrected in accordance with the error amounts. In the first arrangement, during the learning process, a value of the second term (to be referred to as $r_{ji}$ hereinafter) of the right-hand side of equation (8) is obtained by a conventional circuit, and each $r_{ji}$ signal is input to a comparator 800. The first comparator 800 compares the $r_{ji}$ signal with a reference signal to determine only the sign of the $r_{ji}$ signal. The first comparator 800 outputs a first decision signal 801. A first adder 850 sequentially adds the values of the first decision signals 801. The first adder 850 outputs a first sum signal 851 every predetermined timing and each time the series of learning patterns $Z_1, Z_2, \ldots, Z_p$ are input once. The first adder 850 is then reset in response to a reset signal. The first adder 850 is also reset at an initialization timing as a timing prior to learning.

A second comparator 810 compares the first sum signal 851 with a reference signal 808 to determine only the sign of the first sum signal 851. The second comparator 810 outputs a second decision signal 811. The second decision signal 811 corresponds to the updating amount $r_{ji}$ obtained when the series of learning data patterns $Z_1, Z_2, \ldots, Z_p$ are input once. A switch 820 is turned on/off at a predetermined timing. That is, the switch 820 is turned on when proposition of the learning data patterns $Z_1, Z_2, \ldots Z_p$ is started. The switch 820 is turned off when proposition of the learning data patterns $Z_1, Z_2, \ldots, Z_p$ by a predetermined number of times is completed. During the "on" period of the switch 820, the second decision signal 811 from the second comparator 810 is input to a second adder 860. The second adder 860 stores the previously obtained $R_{ji}^n$. The second adder 860 performs an addition represented by equation (8) when proposition of the learning data patterns $Z_1, Z_2, \ldots, Z_p$ is completed. Thereafter, the second adder 860 outputs a sum signal 861 corresponding to $R_{hi}^{n+1}$.

In the circuit having the above arrangement, each synapse uses an error signal a new $r_{ji}$ obtained by a cumulative addition of the error signals $r_{ji}$. Therefore, a synapse connection weight which satisfies a plurality of learning data patterns $Z_1, Z_2, \ldots, Z_p$ can be obtained. In addition, even if the $r_{ji}$ value is inaccurate due to noise, a gain error, an offset, and the like, an accurate error signal can be obtained because an arithmetic operation using the sign of the $r_{ji}$ signal is performed by the first comparator 800, the second comparator 810, and the first adder 850.

In the first arrangement, the updating amounts of the control parameters for all the learning data patterns are replaced with an average value of values of all the learning data patterns on the basis of the sign information of the input data. Even if undesirable signals such as noise superposed on an analog electronic circuit required for realizing equations (1) to (10) and nonideal components of the respective arithmetic units are present, an accurate control parameter value can be obtained. As a result, problems such as a state which disables learning can be solved.

In addition, every time the series of learning data patterns $Z_1, Z_2, \ldots, Z_p$ are input once, the adder 850 is reset in response to the reset signal. Thus, saturation and initial offset of the adder 850 can be prevented.

When quantizers are used in place of the first and second comparators 800 and 810, arithmetic operations in consideration of signal levels in addition to sign information can be performed, and therefore more accurate control parameter values can be obtained.

The second arrangement for obtaining control parameters will be described below.

Figure 6:
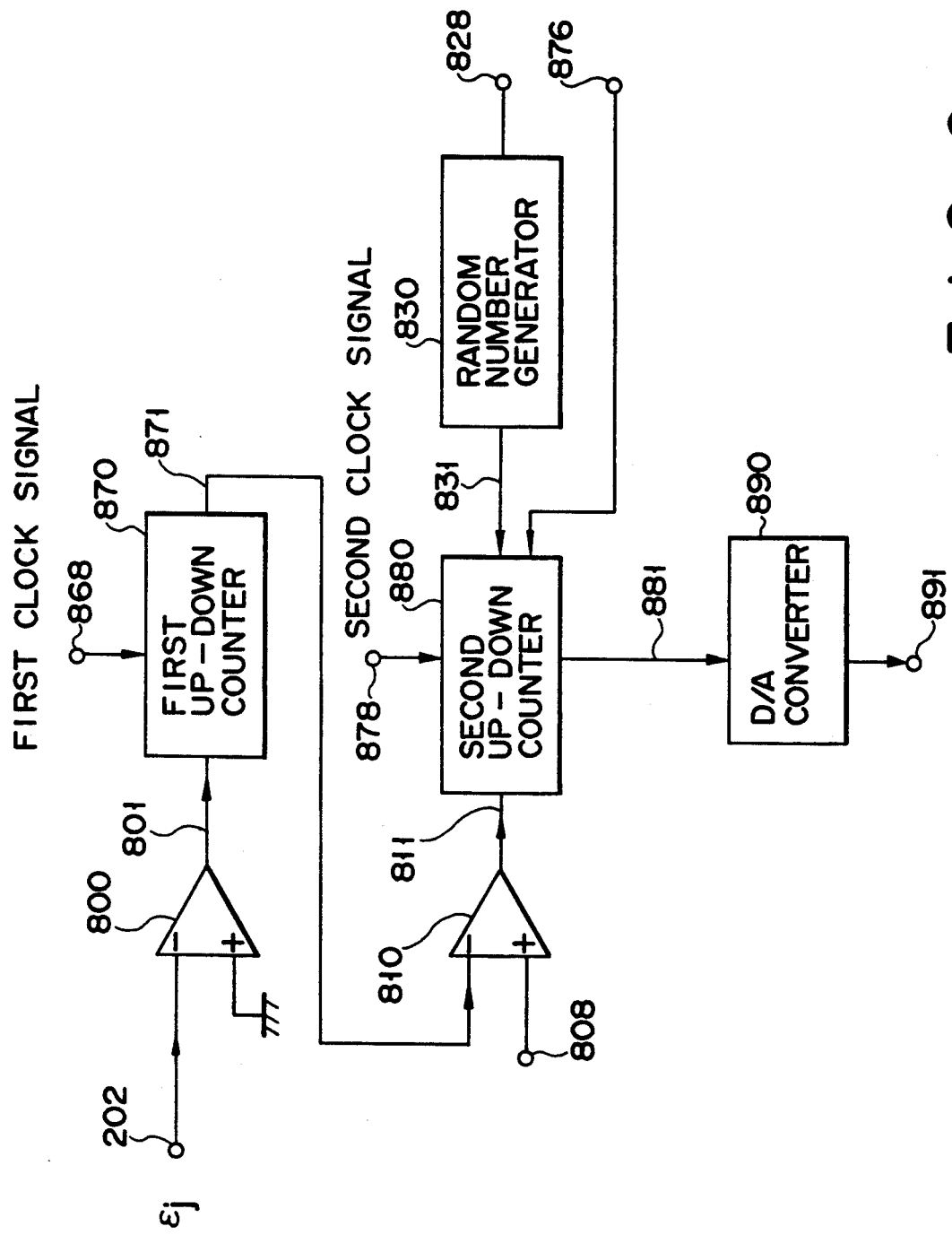
FIG. 6 is a block diagram showing the second arrangement for obtaining control parameter values.

FIG. 6 shows the second arrangement for obtaining the control parameters $R_{ji}^{n+1}$ of equation (8).

Referring to FIG. 6, a $\epsilon_j$ value of equation (8) is input from an input terminal 202. A first comparator 800 determines only the sign of the $\epsilon_j$ signal input to the input terminal 202. The first comparator 800 outputs a first decision signal 801. A first up/down counter 870 performs a counting operation at a predetermined timing defined by a first clock signal 868 and performs a count-up or count-down operation in accordance with the first decision signal 801. The upper and lower limit values of the count of the first up/down counter 870 are predetermined, so that the count-up or count-down operation exceeding the predetermined range is inhibited. By the counting operation of the first up/down counter 870, a first counter output 871 is output.

The first counter output 871 is input to a second comparator 810. The second comparator 810 compares a value preset at a terminal 808 with a value represented by the first counter output 871. Thereafter, the second magnitude comparator 810 outputs a second decision signal 811 representing a positive, zero, or negative level. A second up/down counter 880 performs a counting operation at a predetermined timing in response to a second clock signal 878. The second up/down counter 880 performs a count-up or count-down operation in accordance with the second decision signal 811. The upper and lower limit values of the count of the second up/down counter 880 are predetermined as in the first up/down counter. A count-up or count-down operation of the second up/down counter exceeding the predetermined range is prevented as in the first up/down counter.

A random number generator 830 outputs a random number generator output 831 to the second up/down counter 880 in accordance with a signal input to a signal terminal 828 for controlling the start/stop of an operation of the random number generator 830. It is determined by a signal input to a signal terminal 876 whether the random number generator output 831 is set in the second up/down counter 880. A second counter output 881 from the up/down counter 880 is converted by a D/A converter 890 for converting the second counter output 881 as a digital signal into an analog signal. The D/A converter 890 outputs an analog output signal 891.

Figure 7:
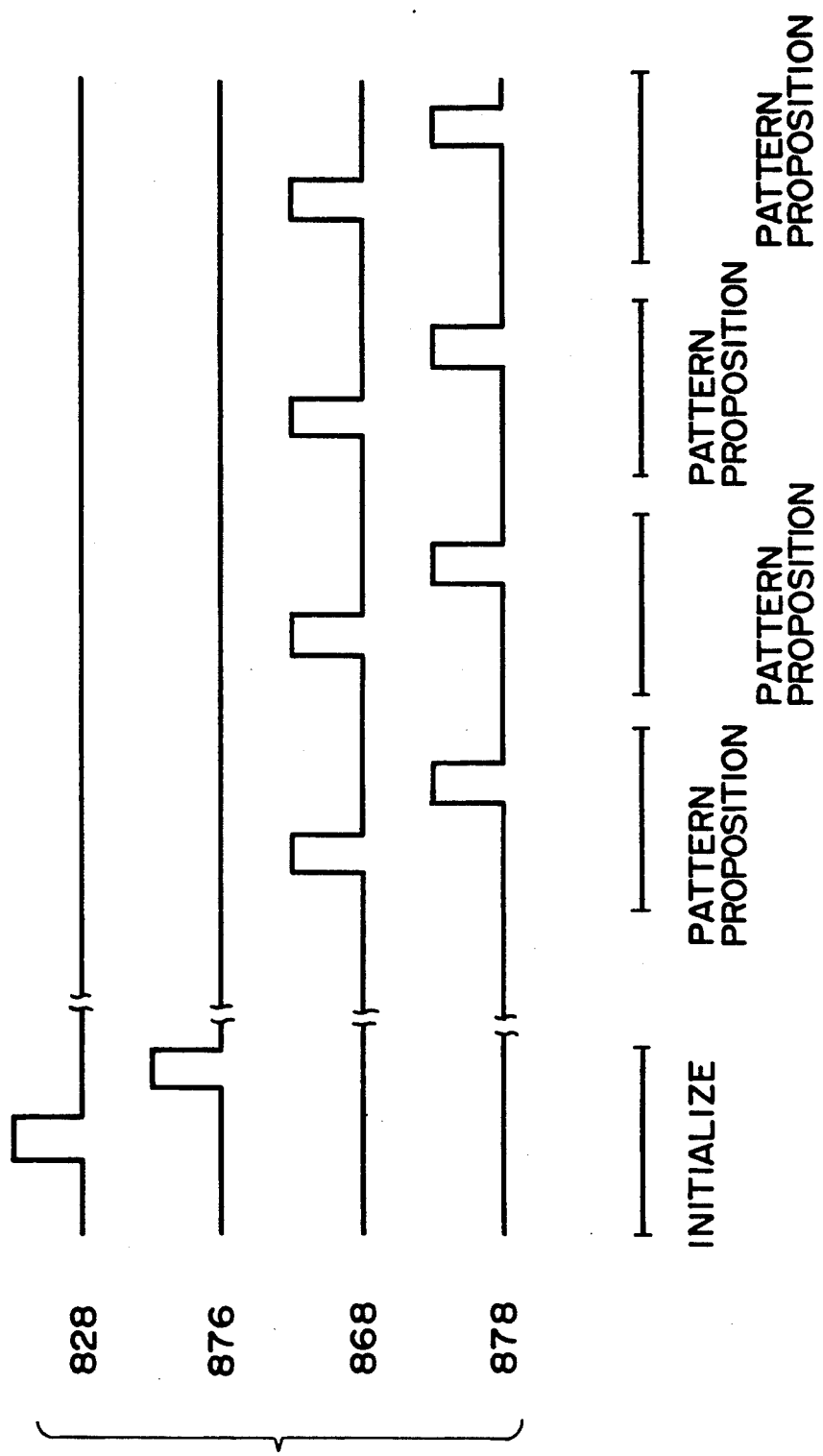
FIG. 7 is a timing chart of the circuit shown in FIG. 6.

An operation of the circuit shown in FIG. 6 will be described with reference to a timing chart in FIG. 7.

The signal terminal 828 is set at a high potential to start the operation of the random number generator 830, thereby continuously generating random number values. During second up/down counter 880 inputs a signal from Random number generator, upper and lower limit is omitted and performed by cyclic operation. During generation of the random numbers, when the signal terminal 876 is set at a high potential, the random number generated by the random number generator 830 is set in the up/down counter 880, and the signal terminal 828 goes to a low potential to disable the random number generator 830.

An updating amount $\epsilon_j$ of the synapse transmission efficiency based on the learning algorithm defined by equations (1) to (10) is applied to the terminal 202, and only the sign of the $\epsilon_j$ signal is determined. The first up/down counter 870 performs a count-up or count-down operation in accordance with the first decision signal 801 as the first comparator output. This count-up or count-down operation is normally performed during learning. In addition, this operation is repeated in accordance with the timing chart in FIG. 7 every time the proposition patterns are input.

The operation of the first up/down counter 870 will be described below.

A cost function E is defined in a learning algorithm employing an optimization technique as follows:

$$E = \sum_j |O_j - T_j|^2$$

but the cost function $E_p$ in the steepest descent method is defined as follows:

$$E_p = \sum_j |O_j - T_j|^2$$

an updating amount $\Delta_p \omega_{ij}$ $$\Delta_p \omega_{ij} \left( = \eta \cdot \text{grad}\left(\sum_p E_p\right)\right)$$

which minimizes the cost function $E_p$ is calculated.

In the above equations, $O_j$ is a neuron output from the final layer j, $T_j$ is the teacher signal, and p is the learning data pattern.

In order to minimize the cost function E, the updating amount $\Delta_p \omega$ for all the learning data patterns must be stored. In the second arrangement, the first up/down counter 870 is used as a register to store the updating amount.

The first comparator 800 serves as a one-bit A/D converter of the updating amount $\Delta_p \omega$ as the analog value. Note that the first and the second up/down counter 870 and 880 may be analog counters.

The first counter output 871 is input to the second comparator 810 and is compared with a value preset at the terminal 808. The second comparator 810 outputs the second decision signal 811 of the positive, zero, or negative level.

The second up/down counter 880 selects a count-up operation, a count-down operation, or a stop operation in accordance with the second decision signal 811. These three counting operations are normally performed in the learning state. In addition, the counting operation of the second up/down counter 880 is repeated in accordance with the timing chart of FIG. 7 every time the learning data patterns are proposed. It is also possible to perform the counting operation of the second up/down counter every time a plurality of learning data patterns are proposed. When the counting operation of the second up/down counter is performed every time a plurality of learning data patterns are proposed, or when the counting operation of the second up/down counter 880 is completed, the second up/down counter 880 may be initialized to allow easy learning of a plurality of desired learning data patterns in place of one learning data pattern.

The second counter output 881 is converted into the analog output value 891 by the D/A converter 890 to obtain an $R_{ij}$ value. The second comparator 810 compares the updating amount $\Delta_p \omega_{ij}$ with the value preset at the terminal 808 to generate the second decision signal 811. The circuit for generating the second decision signal 811 is a circuit arrangement employing the same technique for multiplying an updating amount used for improving convergence with a relaxation coefficient and a technique having an upper limit in the absolute value of each element of the updating amount vector. It is very effective to specify the upper limit of the absolute value of each element of the updating amount vector in the manufacture of a neural network device in an analog circuit which is very different to realize an ideal arithmetic function and which is susceptible to an influence such as noise.

When the first and second up/down counters 870 and 880 used as storage elements are realized by analog storage circuits, the circuit size can be greatly reduced, and the D/A converter 890 can be omitted.

The third arrangement for obtaining the control parameters will be described below.

FIG. 8 is the third arrangement for obtaining $R_{ji}^{n+1}$ values of equation (8).

The circuit in FIG. 8 comprises a synapse group 900 and a cumulative adder 930. In this arrangement, a plurality of comparators, the number of which does not degrade the operation, are connected in parallel with each other to use a common up/down counter. This arrangement allows a reduction in device size.

The synapse group 900 comprise first storage circuits 910 and second storage circuits 920. An updating amount $\epsilon_{ij}$ of the input control parameter is quantized, and the quantized value is stored in the first storage circuit 910. Alternatively, a nonquantized value may be stored in the first storage circuit 910. The first storage circuit 910 corresponds to the part of the first comparator 800 and the first up/down counter 870 shown in FIG. 6. The second storage circuit 920 stores the control parameter value and corresponds to the part of the second up/down counter 880 and the D/A converter 890 in FIG. 6.

The cumulative adder 930 accumulates the quantized updating amounts of the control parameter values or their nonquantized updating amounts and corresponds to the part of the first up/down counter 870, the second up/down counter 880, and the second comparator 810 in FIG. 6. $R_{ij}$ in the second storage circuit 920 indicates a synapse connection weight and controls the signal transmission efficiency between two neurons connected by the $R_{ij}$.

In the circuit having the above arrangement, when a control signal 928 corresponding to the first clock signal 868, the second clock signal 878, and the random number generator output in FIG. 6 is input to the cumulative adder 930, the cumulative adder 930 outputs a signal corresponding to an updating amount $\epsilon_{ji}$ of the value of the synapse transmission efficiency based on the learning algorithm defined by equations (1) to (10). The first storage circuit 910 compares this signal with a reference signal and outputs a signal 901 of a positive, zero, or negative level. The cumulative adder 930 performs a counting operation in accordance with the signal 901 and outputs a counting operation result as a signal 902 to the first storage circuit 910. The first storage circuit 910 holds the information of a signal 903, i.e., the updated $r_{ji}$ value. Subsequently, the cumulative adder 930 compares the latest $r_{ji}$ value read out from the first storage circuit 910 with the reference signal. The cumulative adder 930 then adds the comparison result and the $R_{ji}$ value read out from the second storage circuit 920, i.e., performs a counting operation, thereby updating the $R_{ij}$ value. The cumulative adder 930 then outputs an updated $R_{ij}$ value as a signal 904. Finally, the second storage circuit 920 holds information of the signal 904.

In the third arrangement, the counting functions of the first and second up/down counters 870 and 880 are assigned to the cumulative adder 930, and the number of up/down counters occupying a large area on an integrated circuit can be reduced. In this arrangement, the size of the integrated circuit can be reduced as a whole. The first and second storage circuit 910 and 920, respectively, can be constituted by an SRAM or DRAM.

FIG. 9 is a block diagram showing a schematic arrangement of a device for evaluating performance of a neural network device.

A storage circuit 120 stores sampled environment information 110 and outputs the environment information 110 as a control signal 122 to a sample signal generation circuit 125 and a teacher signal generation circuit 600.

The sample signal generation circuit 125 outputs a sample input signal 127 corresponding to the first input signal 3 in FIG. 1 in accordance with the control signal 122. Meanwhile, the teacher signal generation circuit 600 generates a teacher signal in accordance with the control signal 122 and an external signal 598.

A neural network device 100 performs learning in accordance with the first sample input signal 127 and the teacher signal. At the same time, a learning count is recorded in a count circuit 140. A learning result such as a cost function value is recorded in a record circuit 150.

A deviation value examination circuit 155 calculates an IQ and a deviation examination result of the neural network device 100 on the basis of the record in the record circuit 150. The examination result is recorded in the unit or externally output as a print or the like.

According to the performance evaluation unit for the neural network device, since performance of a neural network device to be manufactured can be objectively evaluated, a product reliability index can be obtained.

When an arithmetic processing circuit for performing arithmetic operations for the plurality of control parameters, i.e., the connection weight elements, is to be realized by an integrated circuit, the connection weight element must be flexibly controlled. For this reason, a device must flexibly control the connection weight element. Examples of this device are thin-film devices such as an EEPROM device, a ferroelectric device, and an ion conductor device. In this case, the common characteristic is that the device operation has initial value dependency.

Figure 10:
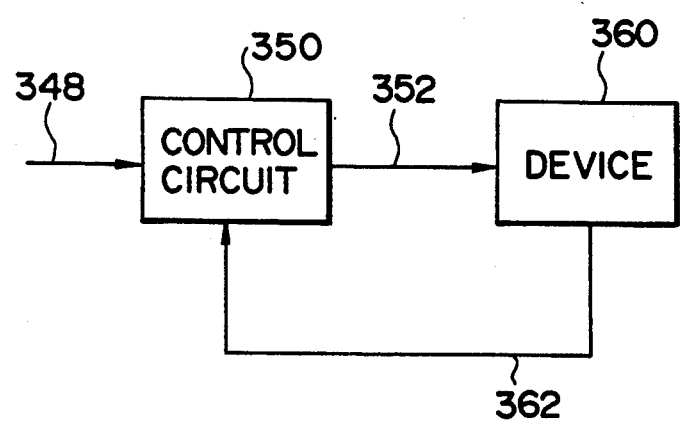
FIG. 10 is a block diagram showing a schematic arrangement of a connection weight element in the neural network device.

A connection weight element according to the present invention will be described with reference to FIG. 10 in consideration of the initial value dependency of the device operation. The connection weight element of the present invention comprises a control circuit 350 and a device 360. A circuit used in the control circuit 350 comprises an adder or divider. The control circuit 350 depends on the characteristics of the device 360. The device 360 includes an EEPROM or ferroelectric device.

The control circuit 350 receives a first state change signal 348, i.e., a signal corresponding to the right-hand side of equation (8) and an internal state monitor signal 362 corresponding to the internal state of the device 360. The control circuit 350 generates a second state change signal 352 in accordance with the signals 348 and 362 and outputs the second state change signal 352 to the device 360. The device 360 is controlled by the second state change signal 352 and the internal state is flexibly controlled. The control circuit 350 is arranged not to be operated when the first state change signal 348 is not input thereto.

The internal state monitor signal 362 represents, e.g., a charge amount of a floating gate of an EEPROM, a residual polarization amount in a ferromagnetic device, or a total ion count in an ion conductor device.

The internal state monitor signal 362 is used because control cannot be performed if the present device state is not known because the device 360 has initial value dependency.

The above reason will be described in a method of generating the second state change signal 352 by using a ferromagnetic device with reference to FIG. 11.

Figure 11:
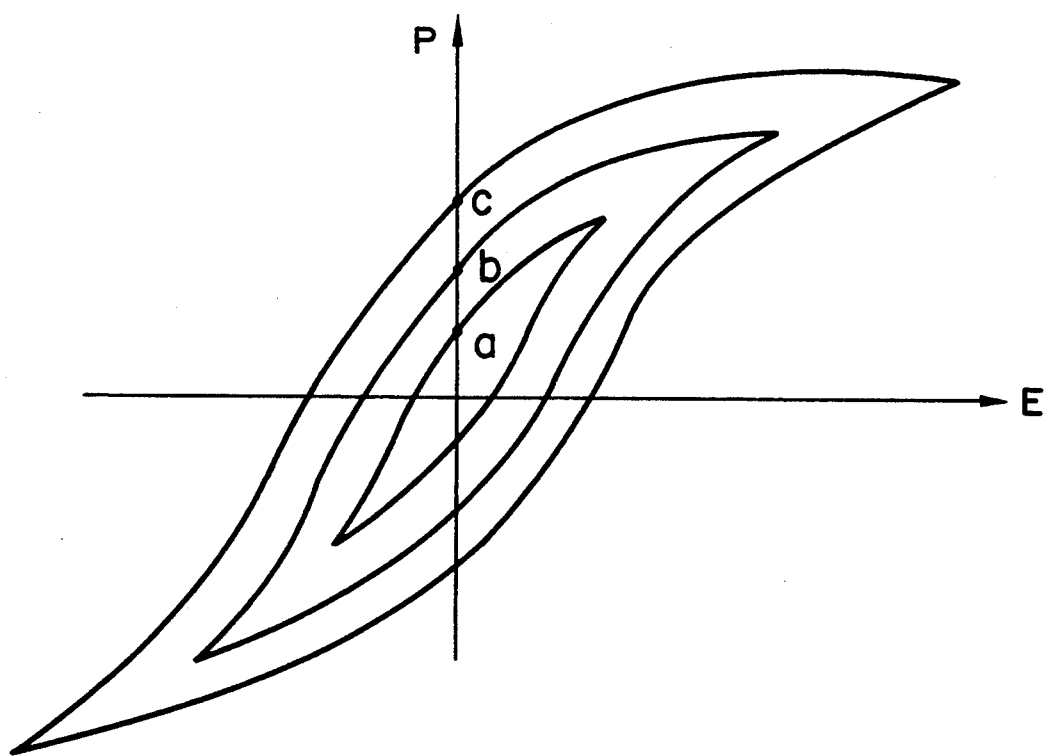
FIG. 11 is a graph for explaining the second state change signal when a ferromagnetic device is used.

FIG. 11 is a graph showing a relationship between an electric field E applied to the ferroelectric device and a residual polarization amount P. A change in polarization amount of the residual polarization amount P shifted from a point a to a point b is equal to that shifted from the point b to a point c, but the absolute values of the electric fields applied to the device are different from each other. For this reason, the internal state monitor signal 362 representing the residual polarization amount corresponding to the zero electric field applied to the device and the first state change signal 348 are added by the control circuit 350. The control circuit 350 then outputs the second state change signal 352 as a sum signal.

When an EEPROM is used, a capacitive coupling is monitored or a change in threshold value is monitored to obtain a charge amount of the floating gate. The internal state monitor signal 362 representing this charge amount and the first state change signal 348 are processed by the control circuit 350 to obtain the second state change signal 352.

FIG. 12 is a block diagram showing the main part of a neural network device according to the third embodiment of the present invention.

The neural network device of the third embodiment is different from that of the first embodiment in that a detection circuit 700 for detecting temperatures such as an internal temperature of the device and an environmental temperature, and a detection result from the detection circuit 700 is input to a first input circuit 200 as a detection signal 701.

In general, if the environmental temperature is different from the internal temperature of the device, an output signal varies even if the same environment information is input. As in the third embodiment, however, a set of environment information and a system temperature is used as new environment information to reduce a thermal influence. A neural network device having higher learning performance can be obtained.

FIG. 13 is a circuit diagram showing a detailed arrangement of the detection circuit 700 of FIG. 12.

A circuit shown in FIG. 13 is also called a Widler current source. This current source comprises a transistor Tr1 having a short-circuited base-collector path, a multiemitter transistor Tr2, and a resistive element R connected to the emitter of the multiemitter transistor Tr2. A reference current $I_{ref}$ is input to the collector of the transistor Tr1, and a current $I_c$ is input to the collector of the multiemitter transistor Tr2. The current $I_c$ is known to be represented as follows (Reference: P. R. Gray & R. G. Meyer, "*ANALYSIS AND DESIGN OF ANALOG INTEGRATED CIRCUITS*", JOHN WILEY & SONS (SECOND EDITION)).

$$I_c = V_t \ln 2 / R$$

for $$V_t = k \cdot T / q$$

where k is the Boltzmann constant, T is the temperature, and g is the electron charge.

As is apparent from the above equation, the current $I_c$ is proportional to the temperature. When the current I is converted into a voltage signal by using a current-/voltage converter, the detection signal 701 is obtained.

By forming the detection circuit 700, the first input circuit 200, and the arithmetic processing circuit 300 by ICs, respectively, or forming them on a single chip, the internal temperature of the device can be detected.

This arrangement is exemplified by bipolar transistors. However, MOS transistors may be used to obtain the same function as described above.

A commercially available temperature sensor may be used to arrange the detection circuit 700 and may output a signal as one of the inputs to the first input circuit 200.

FIG. 14 is a block diagram showing the main part of a neural network device according to the fourth embodiment of the present invention.

The neural network device of the fourth embodiment is different from that of the first embodiment in that a teacher signal is not used, and a detection circuit 700 is arranged as in the third embodiment.

The learning function of the neural network device having the above arrangement using no teacher signal can be improved due to the same reason as in the neural network device (FIG. 12) using the teacher signal.

The present invention is not limited to the particular embodiments described above. For example, in each of the embodiments described above, only the sign of the input signal is determined by the comparator. However, a quantizer may be used in place of the comparator to also determine the magnitude of an input signal in addition to its sign, thereby obtaining a circuit having a high convergence speed. In addition, various other changes and modifications may be made without departing from the spirit and scope of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A neural network device comprising:

input means for performing predetermined processing of external input information and, generating and outputting an input signal;

arithmetic processing means for performing an arithmetic operation of said input signal in accordance with a plurality of control parameters and generating an output signal; and control means for controlling a control parameter of said arithmetic processing means so that the output signal is set to satisfy a predetermined relationship with said input signal, said control means including first cumulative summation means for cumulatively summarizing updating amounts of control parameters updated on the basis of a plurality of teacher signals supplied as an input signal during learning and for cumulatively summarizing said updating amounts of control parameters according to a sign assigned to the updating amount of each control parameter value, and second cumulative summation means for adding currently used control parameter values to values obtained by said first cumulative summation means to obtain new control parameter values, wherein said first cumulative summation means includes a first comparator for comparing said input signal outputted from said input means with a reference signal to determined a sign and outputting a first decision signal, and a first adder for sequentially adding said first decision signal and outputting a first sum signal at a predetermined timing, and said second cumulative summation means includes a second comparator for comparing said first sum signal with a reference value to determine a sign of the sum signal and outputting a second decision signal, switch means, turn on/off at a predetermined timing, for controlling an input timing of said second decision signal to a second adder, and said second adder for performing a predetermined addition in accordance with the second decision signal and outputting a second sum signal.

2. A device according to claim 1, wherein said first cumulative summation means includes a first up/down counter, whose one of count-up and count-down operation if selected in accordance with the first decision signal, for outputting a first counter output, a first memory for storing said first counter output, and means for controlling said first up/down counter for performing a counting operation arranged such that a counting operation is performed at a predetermined timing in response to a first clock signal a counter value has upper and lower limits, and said second cumulative summation means includes a second up/down counter, whose one of count-up and count-down operations is selected in accordance with the second decision signal, for outputting a second counter output, a second memory for storing said second counter output, and means for controlling said second up/down counter for performing a counting operation at a predetermined timing in response to a second clock signal.

3. A device according to claim 2, further comprising:

a D/A converter for converting a digital signal outputted as said second counter output into an analog signal, and a random number generator for resetting said second up/down counter.

4. A device according to claim 1, further comprising receive means for receiving said teacher signals, wherein a part said control means is arranged outside said arithmetic processing means, and said control means includes means for causing said part of said control means arranged outside said arithmetic processing means to receive said input signal through said receive means.

5. A device according to claim 1, wherein said control means further includes a synapse group including a plurality of synapses, each having first memory and second memory, each of said first memory for storing updating amount of said control parameter, each of said second memory for storing a value of said control parameter, and cumulative summation means, defined at individual said synapse group, for performing cumulative summation of the updating amounts of said first and second memory.

* * * * *